United States Patent
Takahashi et al.

(10) Patent No.: US 8,786,949 B2
(45) Date of Patent: Jul. 22, 2014

(54) METHOD FOR POLARIZING TERAHERTZ ELECTROMAGNETIC WAVE USING POLARIZER, AND POLARIZER

(71) Applicant: Panasonic Corporation, Osaka (JP)

(72) Inventors: Kohei Takahashi, Osaka (JP); Tsutomu Kanno, Kyoto (JP); Akihiro Sakai, Nara (JP); Yuka Yamada, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/943,613

(22) Filed: Jul. 16, 2013

(65) Prior Publication Data

US 2013/0301128 A1 Nov. 14, 2013

Related U.S. Application Data

(63) Continuation of application No. PCT/JP2012/004913, filed on Aug. 2, 2012.

(30) Foreign Application Priority Data

Nov. 16, 2011 (JP) ................. 2011-250356

(51) Int. Cl.
*G02B 5/30* (2006.01)
*B29D 11/00* (2006.01)

(52) U.S. Cl.
CPC ........ *G02B 5/3083* (2013.01); *B29D 11/00644* (2013.01); *Y10S 359/90* (2013.01)
USPC ............ 359/489.07; 359/489.15; 359/489.17; 359/900

(58) Field of Classification Search
CPC ........................ G02B 5/3083; B29D 11/00644
USPC ............. 359/487.05, 489.01, 489.02, 489.03, 359/489.06, 489.07, 900
See application file for complete search history.

(56) References Cited

U.S. PATENT DOCUMENTS

| | | | | |
|---|---|---|---|---|
| 3,471,799 A | * | 10/1969 | Evtuhov | 372/19 |
| 3,760,218 A | | 9/1973 | Cronin | |
| 4,772,104 A | * | 9/1988 | Buhrer | 359/489.07 |
| 6,017,655 A | | 1/2000 | Ovshinsky et al. | |
| 6,268,962 B1 | * | 7/2001 | Reeder | 359/489.07 |

(Continued)

FOREIGN PATENT DOCUMENTS

| | | |
|---|---|---|
| JP | 2009-052920 A | 3/2009 |
| JP | 2011-192857 A | 9/2011 |

OTHER PUBLICATIONS

Itsunari Yamada, Terahertz wire-grid polarizers with micrometer-ptich A1 gatings, Optics Letters, vol. 34, No. 3, Feb. 1, 2009, pp. 274-276.

(Continued)

*Primary Examiner* — Ricky D Shafer
(74) *Attorney, Agent, or Firm* — McDermott Will & Emery LLP (57) ABSTRACT

A method for polarizing an electromagnetic wave having a frequency of not less than 0.1 THz and not more than 0.8 THz using a polarizer includes steps (a) and (b). The step (a) includes preparing the polarizer. The polarizer includes: a sapphire single crystalline layer; and a $Ca_xCoO_2$ crystalline layer. The $Ca_xCoO_2$ crystalline layer is stacked on the sapphire single crystalline layer, a surface of the $Ca_xCoO_2$ crystalline layer has a (100) plane orientation and the $Ca_xCoO_2$ crystalline layer has a thickness of not less than 2 micrometers and not more than 20 micrometers. The step (b) includes irradiating the polarizer with the electromagnetic wave having a frequency of not less than 0.1 THz and not more than 0.8 THz to output an output wave having only a component parallel to a c-axis direction of the sapphire single crystalline layer.

10 Claims, 12 Drawing Sheets

(56) References Cited

U.S. PATENT DOCUMENTS

| | | | |
|---|---|---|---|
| 7,382,535 B2 * | 6/2008 | Hulsey | 359/489.07 |
| 2010/0142047 A1 | 6/2010 | Fujii et al. | |
| 2010/0209816 A1 | 8/2010 | Kwak et al. | |

OTHER PUBLICATIONS

Brian L. Cushing et al., Topotactic Routes to Layered Calcium Cobalt Oxides, Journal of Solid State Chemistry, vol. 141, pp. 385-391, (1998).

Lei Ren, Carbon Nanotube Terahertz Polarizer, Nano Letters, vol. 9, No. 7, pp. 2610-2613, (2009).

H.X. Yang, "Structural properties and cation ordering in layered hexagonal $Ca_x CoO_2$," Physical Review B. vol. 73, 014109 (2006), pp. 014109-1-014109-6.

International Search Report issued in PCT/JP2012/004913 with Dated of mailing Nov. 6, 2012.

* cited by examiner

Fig.24 ated filing date of Aug. 2, 2012, which claims priority of Japanese Patent Application No. 2011-250356 filed on Nov. 16, 2011, the contents of which are hereby incorporated by reference.

METHOD FOR POLARIZING TERAHERTZ ELECTROMAGNETIC WAVE USING POLARIZER, AND POLARIZER

This is a continuation of International Application No. PCT/JP2012/004913, with an international filing date of Aug. 2, 2012, which claims priority of Japanese Patent Application No. 2011-250356 filed on Nov. 16, 2011, the contents of which are hereby incorporated by reference.

TECHNICAL FIELD

The present invention relates to a method for polarizing a terahertz electromagnetic wave using a polarizer.

BACKGROUND OF THE INVENTION

A terahertz electromagnetic wave is an electromagnetic wave having a frequency of 0.1 THz or more. Patent Literature 1, Non Patent Literature 1, and Non Patent Literature 2 disclose a method for polarizing a terahertz electromagnetic wave.

CITATION LIST

Patent Literature

PTL 1: Japanese Patent Laid-Open Publication No. 2009-052920

Non Patent Literature

NPTL 1: Itsunari Yamada et. al., "Terahertz wire-grid polarizers with micrometer-pitch Al gratings", Optics Letters, (2009), Vol. 34, No. 3, p.p. 274-276
NPTL 2: Lei Ren et. al., "Carbon Nanotube Terahetz Polarizer", Nano Letters, (2009), Vol. 9, No. 7, p.p. 2610-2613
NPTL 3: Brian. L. Cushing et. al., "Topotactic Routes to Layered Calcium Cobalt Oxides", Journal of solid state chemistry, Vol. 141, pages 385-391 (1998)
NPTL 4: H. X. Yang et. al, "Structural properties and cation ordering in layered hexagonal $Ca_xCoO_2$", Physical Review, B, Vol. 73, 014109-1-014109-6 (2006)

BRIEF SUMMARY OF THE INVENTION

Technical Problem

An object of the present invention is to provide a novel method for polarizing a terahertz electromagnetic wave using a polarizer.

Solution to Problem

A method for polarizing an electromagnetic wave having a frequency of not less than 0.1 THz and not more than 0.8 THz using a polarizer is disclose. The method includes steps (a) and (b). The step (a) includes preparing the polarizer. The polarizer includes a sapphire single crystalline layer and a $Ca_xCoO_2$ crystalline layer. The $Ca_xCoO_2$ crystalline layer is stacked on the sapphire single crystalline layer, a surface of the $Ca_xCoO_2$ crystalline layer has a (100) plane orientation, and the $Ca_xCoO_2$ crystalline layer has a thickness of not less than 2 micrometers and not more than 20 micrometers. The step (b) includes irradiating the polarizer with the electromagnetic wave having a frequency of not less than 0.1 THz and not more than 0.8 THz to output an output wave having only a component parallel to a c-axis direction of the sapphire single crystalline layer.

In the above method, the $Ca_xCoO_2$ crystalline layer may have a thickness of not less than 2 micrometers and not more than 9 micrometers.

In the above method, the $Ca_xCoO_2$ crystalline layer may have a thickness of not less than 2 micrometers and not more than 4 micrometers.

In the above method, in the step (b), the sapphire single crystalline layer may be irradiated with the electromagnetic wave and the output wave is output from the $Ca_xCoO_2$ crystalline layer.

In the above method, in the step (b), the $Ca_xCoO_2$ crystalline layer may be irradiated with the electromagnetic wave and the output wave is output from the sapphire single crystalline layer.

In the above method, in the step (b), the polarizer may be irradiated with the electromagnetic wave travelling along the normal direction of the polarizer.

In the above method, in the step (b), the output wave may be output from the polarizer along the normal direction of the polarizer.

A polarizer includes a sapphire single crystalline layer and a $Ca_xCoO_2$ crystalline layer. The $Ca_xCoO_2$ crystalline layer is stacked on the sapphire single crystalline layer, a surface of the $Ca_xCoO_2$ crystalline layer has a (100) plane orientation, and the $Ca_xCoO_2$ crystalline layer has a thickness of not less than 2 micrometers and not more than 20 micrometers.

In the above polarizer, the $Ca_xCoO_2$ crystalline layer may have has a thickness of not less than 2 micrometers and not more than 9 micrometers.

In the above polarizer the $Ca_xCoO_2$ crystalline layer may have a thickness of not less than 2 micrometers and not more than 4 micrometers.

Advantageous Effects of Invention

The present invention provides a novel method for polarizing a terahertz electromagnetic wave using a polarizer.

DESCRIPTION OF EMBODIMENTS

An embodiment of the present invention is described below with reference to the drawings.

Embodiment

Figure 1:
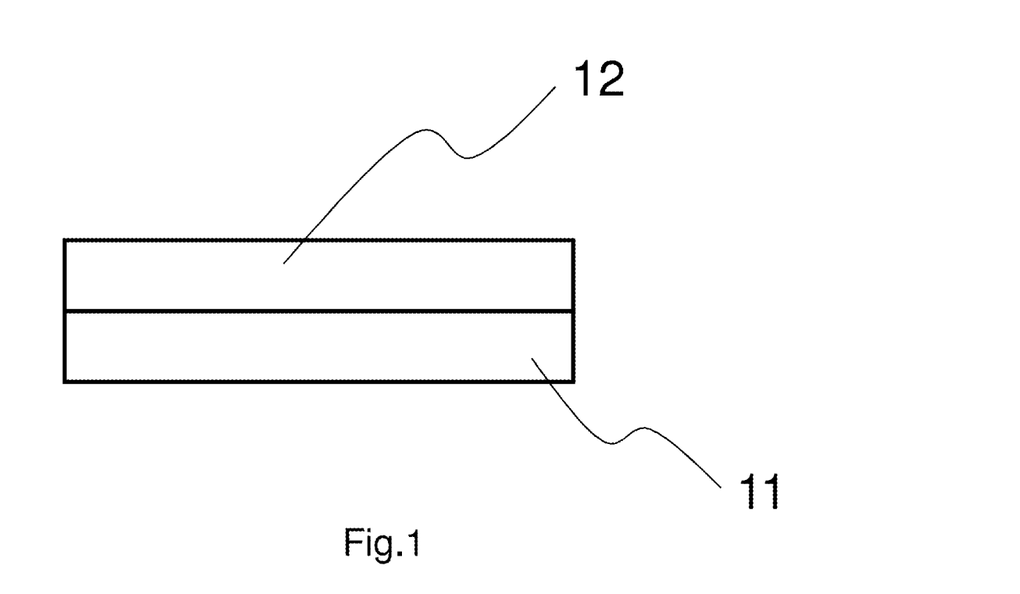
FIG. 1 shows a cross-sectional view of a terahertz polarizer according to an embodiment.

FIG. 1 shows a cross-sectional view of a terahertz polarizer (hereinafter, referred to as "polarizer") according to the embodiment. The polarizer has a shape of a plate. The polarizer comprises a sapphire single crystalline layer 11 and a $Ca_xCoO_2$ crystalline layer 12. The $Ca_xCoO_2$ crystalline layer 12 is stacked on the sapphire single crystalline layer 11. It is preferable that no layer be interposed between the $Ca_xCoO_2$ crystalline layer 12 and the sapphire single crystalline layer 11.

Figure 2:
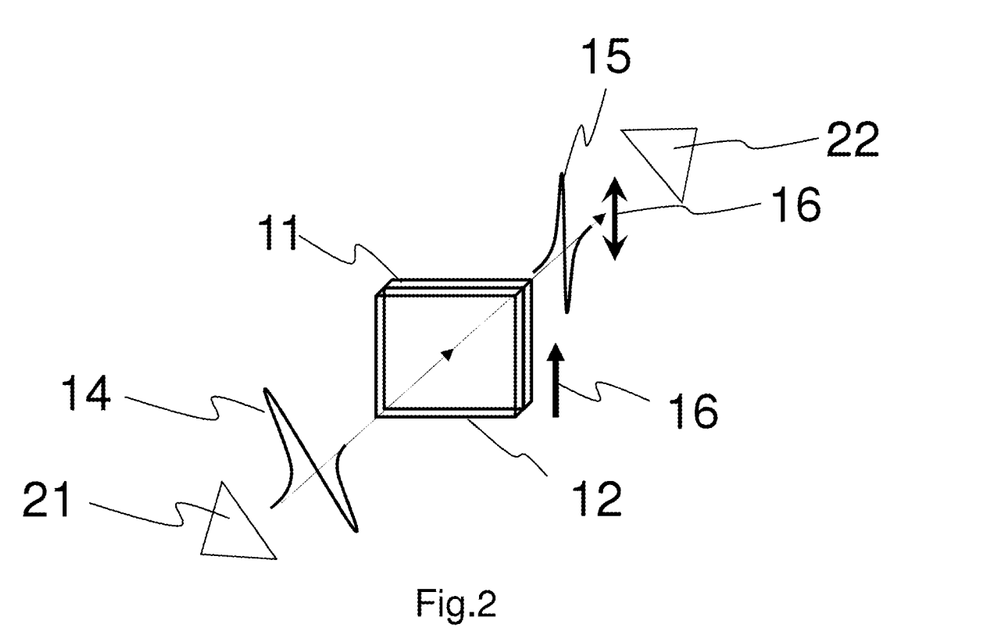
FIG. 2 shows schematically a method according to the embodiment.

FIG. 2 shows schematically a method for polarizing an electromagnetic wave using the polarizer in the embodiment.

The electromagnetic wave has a frequency of not less than 0.1 THz and not more than 0.8 THz.

The polarizer is irradiated with an electromagnetic wave 14, i.e. an incident wave. In FIG. 2, the obverse surface of the $Ca_xCoO_2$ crystalline layer 12 is irradiated with the electromagnetic wave 14.

The electromagnetic wave 14 which has passed through the polarizer is output from the polarizer as an output wave 15. In FIG. 2, the output wave 15 is output from the reverse surface of the sapphire single crystalline layer 11. Instead of this, the obverse surface of the sapphire single crystalline layer 11 may be irradiated with the electromagnetic wave 14, and the output wave 15 may be output from the reverse surface of the $Ca_xCoO_2$ crystalline layer 12. The output wave 15 has only a component which is parallel to the c-axis direction (see an arrow 16 in FIG. 2) of the sapphire single crystalline layer 11. The output wave 15 does not have other components. An example of the other components is a component which is perpendicular to the c-axis direction of the sapphire single crystalline layer 11.

It is preferable that the sapphire single crystalline layer 11 have a (11-20) plane orientation.

The surface of the $Ca_xCoO_2$ crystalline layer 12 has a (100) plane orientation. When the surface has a (001) plane orientation, the incident light is not polarized, as demonstrated in comparative examples 5-15, which are described later.

The value of x is not limited as long as the crystallinity of the $Ca_xCoO_2$ crystalline layer 12 is maintained. According to Non Patent Literature 3 and Non Patent Literature 4, the preferable value of x is not less than 0.15 and not more than 0.55.

The $Ca_xCoO_2$ crystalline layer 12 has a thickness of not less than 2 micrometers and not more than 20 micrometers. When the thickness is less than 2 micrometers, the incident light is not polarized sufficiently, as demonstrated in comparative examples 1 and 2, which are described later. In other words, when the thickness is less than 2 micrometers, the component which is perpendicular to the c-axis direction of the sapphire single crystalline layer 11 is not removed sufficiently. On the contrary, when the thickness is more than 20 micrometers, it is difficult for the electromagnetic wave to pass through the polarizer, as demonstrated in comparative examples 3 and 4, which are described later. Accordingly, the output wave 15 having a sufficient intensity is not obtained.

It is preferable that the $Ca_xCoO_2$ crystalline layer 12 have a thickness of not less than 2 micrometers and not more than 9 micrometers, as demonstrated in examples 1-4. It is preferable that the $Ca_xCoO_2$ crystalline layer 12 have a thickness of not less than 2 micrometers and not more than 4 micrometers, as demonstrated in examples 1-2. This is because the component which is perpendicular to the c-axis direction of the sapphire single crystalline layer 11 is removed sufficiently, and the transmittance of the component which is parallel to the c-axis direction of the sapphire single crystalline layer 11 is high.

The angle formed between the obverse surface of the polarizer and the incident wave is not limited. It is preferable that the polarizer having a shape of a plate be irradiated with the incident wave travelling along the normal direction of the polarizer.

EXAMPLES

The following examples describe the present invention in more detail.

Example 1

Fabrication of a Polarizer

A $Ca_xCoO_2$ crystalline layer was formed by high frequency magnetron sputtering on a sapphire crystal substrate having a (11-20) plane orientation (namely, an a-plane orientation) on the surface thereof. This sapphire crystal substrate was used as the sapphire single crystalline layer 11.

More particularly, in this high frequency magnetron sputtering, a mixture target having a Ca:Co molar ratio of 1:1 was used.

First, the gas in a film formation chamber was exhausted so that the inside of the film formation chamber had a pressure of less than $1.0 \times 10^3$.

Then, while a gas mixture of argon (volume ratio: 96%) and oxygen (volume ratio: 4%) was introduced, the sapphire single crystalline layer was heated by a heater. Then, a $Ca_xCoO_2$ crystalline layer 12 having a thickness of 2 micrometers and having a (100) plane orientation on the surface thereof was formed on the sapphire single crystalline layer 11 by high frequency magnetron sputtering on the surface thereof. In this way, a polarizer according to the example 1 was obtained.

The condition of the high frequency magnetron sputtering is described below.
Pressure in the film formation chamber: 5 Pa
Temperature of the sapphire crystal substrate: 450 degrees Celsius
RF power: 100 W After the $Ca_xCoO_2$ crystalline layer 12 was formed, the polarizer was cooled to room temperature under a pressure of 5 Pa over 60 minutes.

The composition ratio of cations included in the $Ca_xCoO_2$ crystalline layer 12 was measured using an energy dispersive X-ray analyzer. As a result, the composition ratio of Ca:Co was about 1:2, namely x=0.5.

(Irradiation with the Incident Wave)

As shown in FIG. 2, the obtained polarizer was disposed between an electromagnetic wave emitting device 21 and an electromagnetic wave receiver 22.

The electromagnetic wave emitting device 21 is a dipole-type photoconductive antenna of low-temperature-grown GaAs (available from Hamamatsu Photonics K.K.). This photoconductive antenna was activated with a Ti:Sapphire laser.

The electromagnetic wave receiver 22 is a Bowtie-type photoconductive antenna of low-temperature-grown GaAs (available from Hamamatsu Photonics K.K.).

While the frequency was varied from 0.1 THz to 0.8 THz, an electromagnetic wave was emitted from the electromagnetic wave emitting device 21.

The emitted electromagnetic wave was a pulsed electromagnetic wave which was polarized linearly.

The obverse surface of the $Ca_xCoO_2$ crystalline layer 12 was irradiated with the electromagnetic wave from the normal direction of the polarizer.

The electromagnetic wave was output as an output wave 15 from the reverse surface of the sapphire single crystalline layer 11. The component of the light which is parallel to the c-axis direction of the sapphire single crystalline layer 11 was received by the electromagnetic wave receiver 22. The component of the light was included in the output wave 15. Similarly, the component of the light which is perpendicular to the c-axis direction of the sapphire single crystalline layer 11 was also received by the electromagnetic wave receiver 22.

Figure 5:
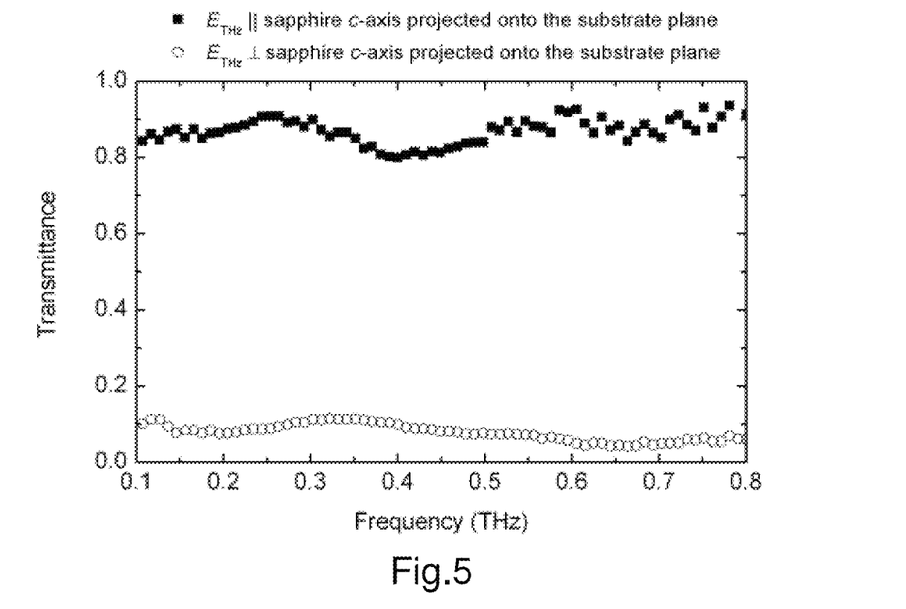
FIG. 5 shows the transmittance spectrum of a $Ca_xCoO_2$ crystalline layer (film thickness: 2 micrometers) formed on the sapphire single crystalline layer having an a-plane orientation on the surface thereof.

FIG. 5 shows a transmittance spectrum measured according to the example 1 by the electromagnetic wave receiver 22.

In FIG. 3-FIG. 13, the black square indicates the transmittance of the components of the light which are parallel to the c-axis direction of the sapphire single crystalline layer 11 having a (11-20) plane orientation (namely, an a-plane orientation). In FIG. 3-FIG. 13, the white circle indicates the transmittance of the components of the light which are perpendicular to the c-axis direction of the sapphire single crystalline layer 11 having a (11-20) plane orientation (namely, an a-plane orientation).

The transmittance was calculated in accordance with the following formula:

Transmittance=Intensity of the output wave received by the electromagnetic wave receiver 22/Intensity of the electromagnetic wave emitted from the electromagnetic wave emitting device 21.

Example 2

Figure 6:
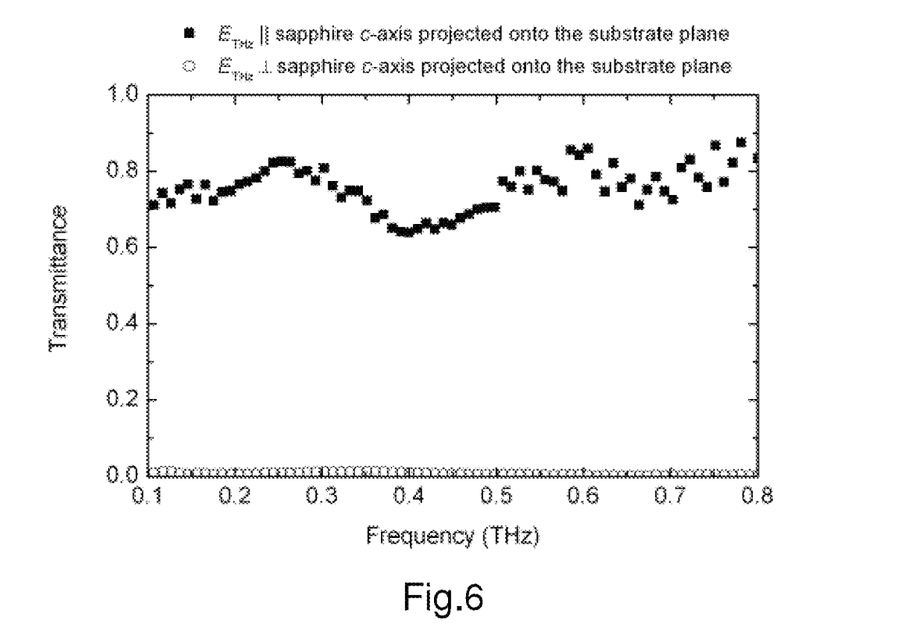
FIG. 6 shows the transmittance spectrum of a $Ca_xCoO_2$ crystalline layer (film thickness: 4 micrometers) formed on the sapphire single crystalline layer having an a-plane orientation on the surface thereof.

An experiment similar to the example 1 was performed except that the thickness of the $Ca_xCoO_2$ crystalline layer 12 was 4 micrometers. FIG. 6 shows the transmittance spectrum measured in the example 2.

Example 3

Figure 7:
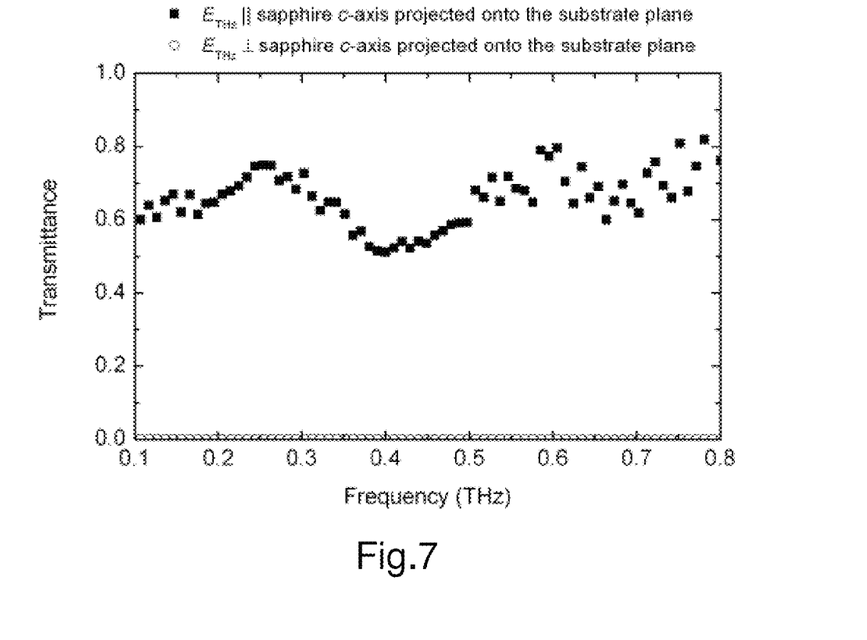
FIG. 7 shows the transmittance spectrum of a $Ca_xCoO_2$ crystalline layer (film thickness: 6 micrometers) formed on the sapphire single crystalline layer having an a-plane orientation on the surface thereof.

An experiment similar to the example 1 was performed except that the thickness of the $Ca_xCoO_2$ crystalline layer 12 was 6 micrometers. FIG. 7 shows the transmittance spectrum measured in the example 3.

Example 4

Figure 8:
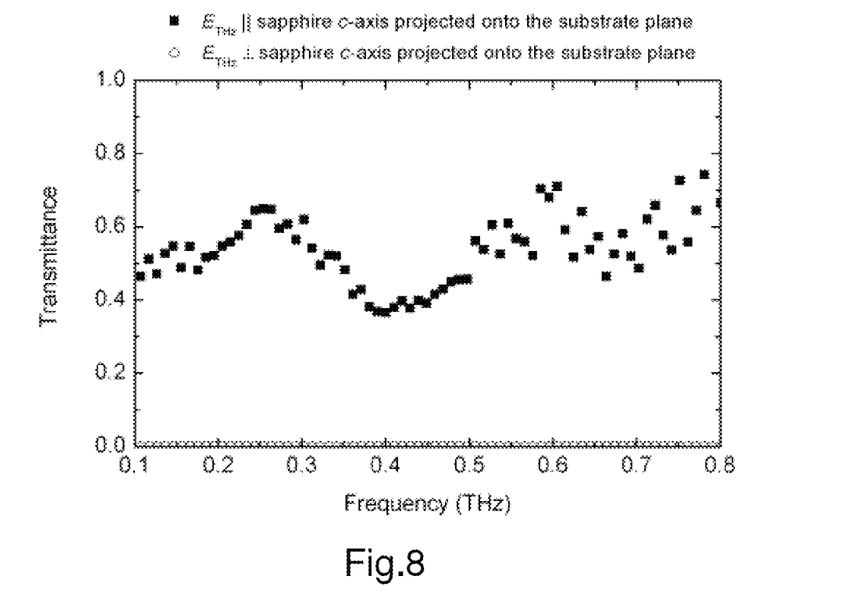
FIG. 8 shows the transmittance spectrum of a $Ca_xCoO_2$ crystalline layer (film thickness: 9 micrometers) formed on the sapphire single crystalline layer having an a-plane orientation on the surface thereof.

An experiment similar to the example 1 was performed except that the thickness of the $Ca_xCoO_2$ crystalline layer 12 was 9 micrometers. FIG. 8 shows the transmittance spectrum measured in the example 4.

Example 5

Figure 9:
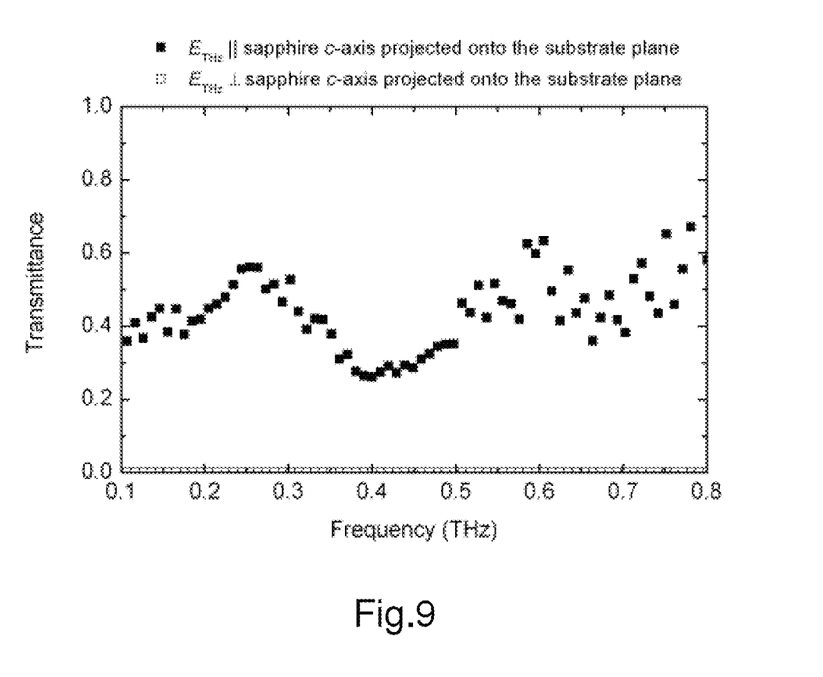
FIG. 9 shows the transmittance spectrum of a $Ca_xCoO_2$ crystalline layer (film thickness: 12 micrometers) formed on the sapphire single crystalline layer having an a-plane orientation on the surface thereof.

An experiment similar to the example 1 was performed except that the thickness of the $Ca_xCoO_2$ crystalline layer 12 was 12 micrometers. FIG. 9 shows the transmittance spectrum measured in the example 5.

Example 6

Figure 10:
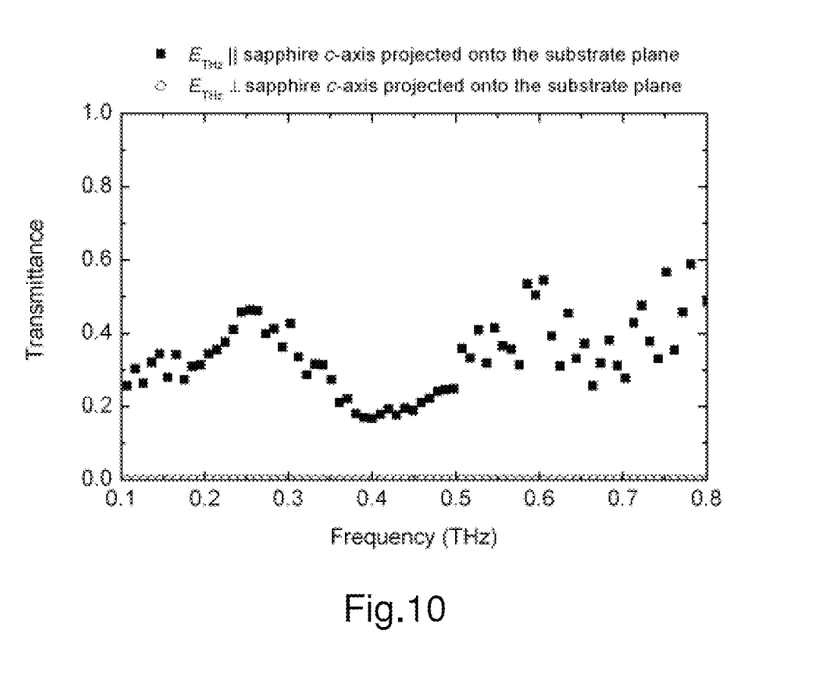
FIG. 10 shows the transmittance spectrum of a $Ca_xCoO_2$ crystalline layer (film thickness: 16 micrometers) formed on the sapphire single crystalline layer having an a-plane orientation on the surface thereof.

An experiment similar to the example 1 was performed except that the thickness of the $Ca_xCoO_2$ crystalline layer 12 was 16 micrometers. FIG. 10 shows the transmittance spectrum measured in the example 6.

Example 7

Figure 11:
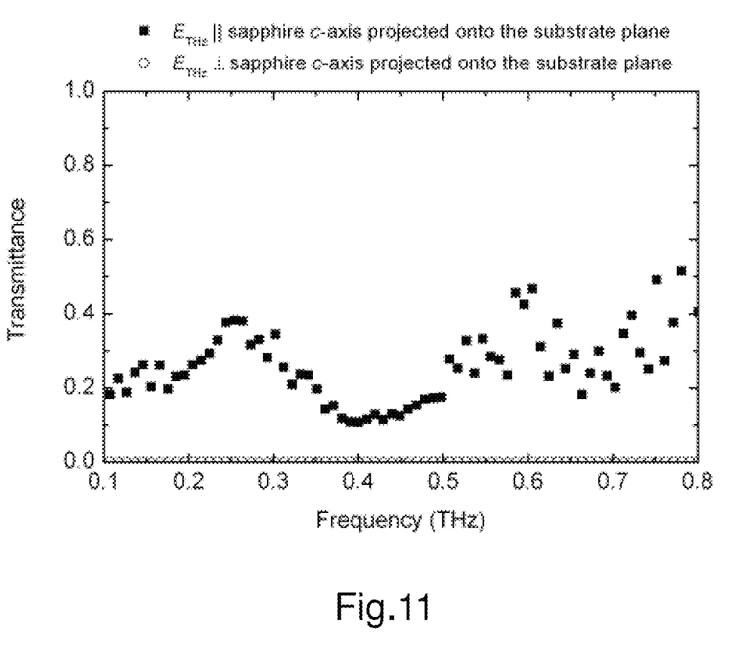
FIG. 11 shows the transmittance spectrum of a $Ca_xCoO_2$ crystalline layer (film thickness: 20 micrometers) formed on the sapphire single crystalline layer having an a-plane orientation on the surface thereof.

An experiment similar to the example 1 was performed except that the thickness of the $Ca_xCoO_2$ crystalline layer 12 was 20 micrometers. FIG. 11 shows the transmittance spectrum measured in the example 7.

Comparative Example 1

Figure 3:
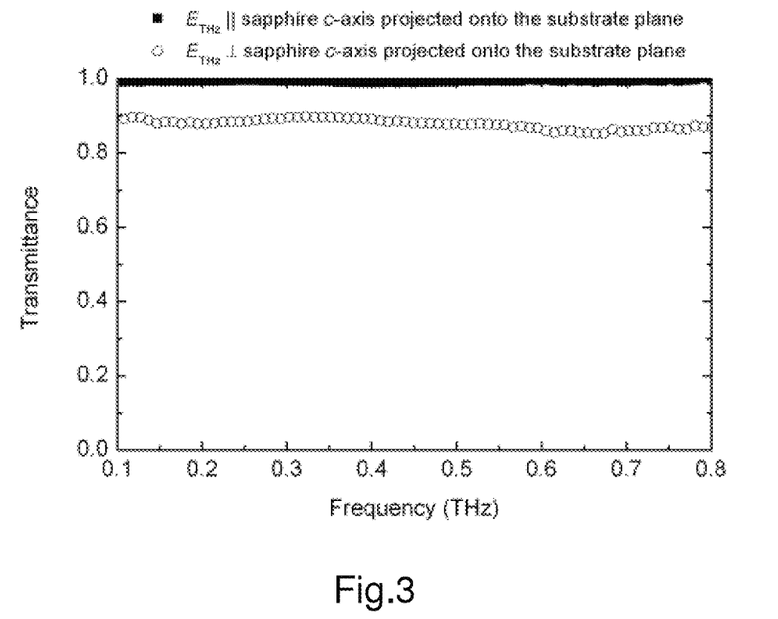
FIG. 3 shows the transmittance spectrum of a $Ca_xCoO_2$ crystalline layer (film thickness: 0.1 micrometer) formed on a sapphire single crystalline layer having an a-plane orientation on the surface thereof.

An experiment similar to the example 1 was performed except that the thickness of the $Ca_xCoO_2$ crystalline layer 12 was 0.1 micrometer. FIG. 3 shows the transmittance spectrum measured in the comparative example 1.

Comparative Example 2

Figure 4:
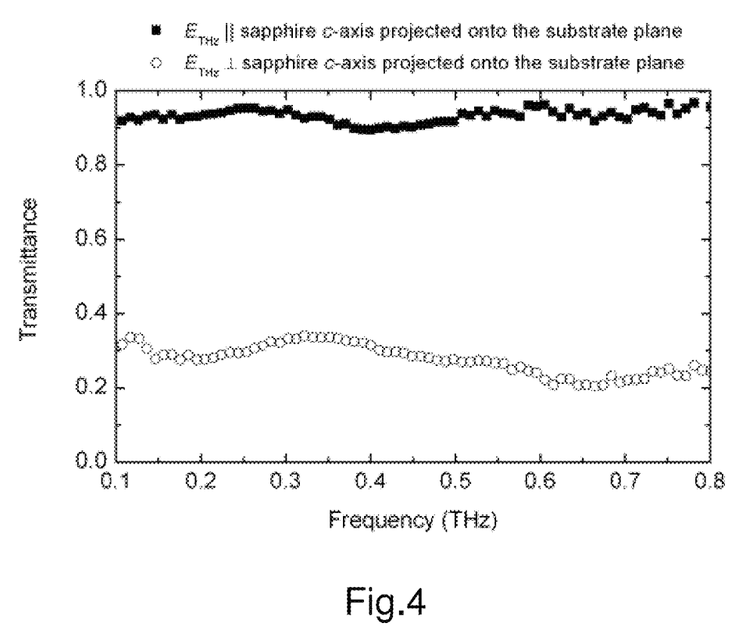
FIG. 4 shows the transmittance spectrum of a $Ca_xCoO_2$ crystalline layer (film thickness: 1 micrometer) formed on the sapphire single crystalline layer having an a-plane orientation on the surface thereof.

An experiment similar to the example 1 was performed except that the thickness of the $Ca_xCoO_2$ crystalline layer 12 was 1 micrometer. FIG. 4 shows the transmittance spectrum measured in the comparative example 2.

Comparative Example 3

Figure 12:
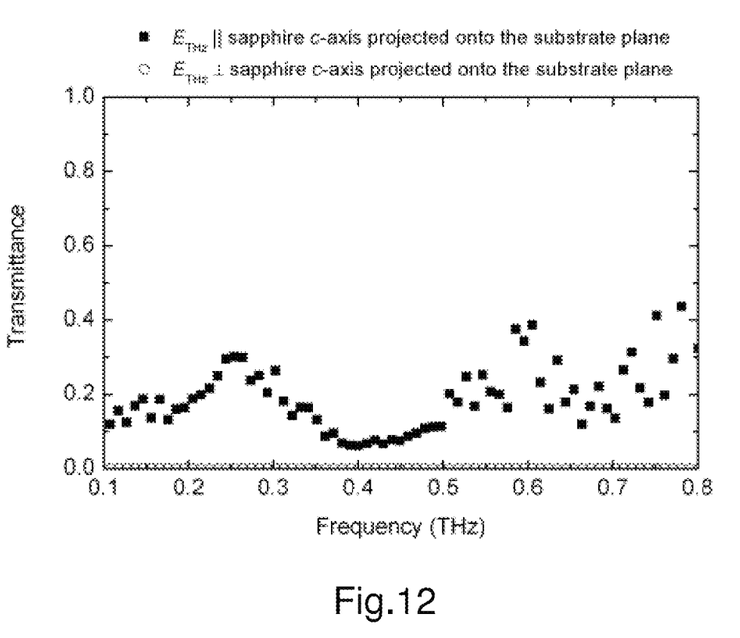
FIG. 12 shows the transmittance spectrum of a $Ca_xCoO_2$ crystalline layer (film thickness: 25 micrometers) formed on the sapphire single crystalline layer having an a-plane orientation on the surface thereof.

An experiment similar to the example 1 was performed except that the thickness of the $Ca_xCoO_2$ crystalline layer 12 was 25 micrometers. FIG. 12 shows the transmittance spectrum measured in the comparative example 3.

Comparative Example 4

Figure 13:
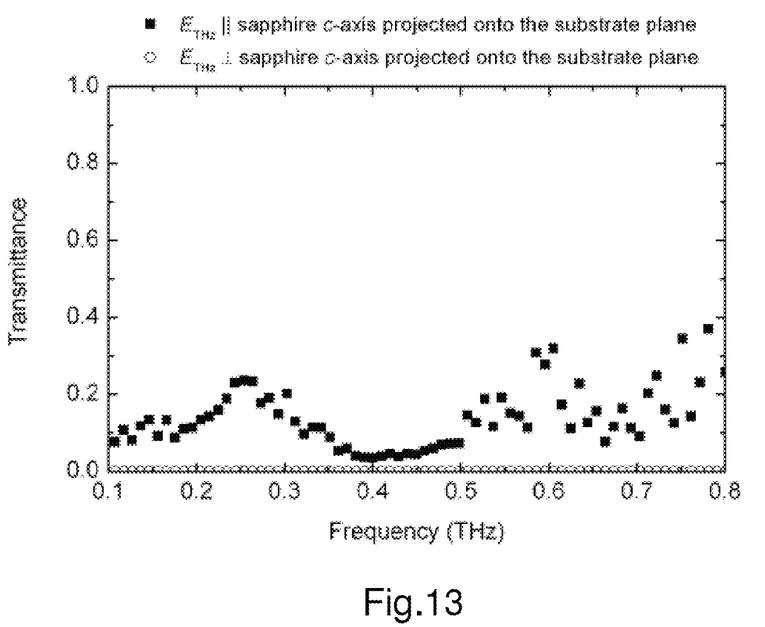
FIG. 13 shows the transmittance spectrum of a $Ca_xCoO_2$ crystalline layer (film thickness: 30 micrometers) formed on the sapphire single crystalline layer having an a-plane orientation on the surface thereof.

An experiment similar to the example 1 was performed except that the thickness of the $Ca_xCoO_2$ crystalline layer 12 was 30 micrometers. FIG. 13 shows the transmittance spectrum measured in the comparative example 4.

The following Table 1 collectively shows the average transmittance in the examples 1-7 and in the comparative examples 1-4. In Table 1, the phrase "c-axis parallelism average transmittance" means an average value of the transmittance of the component of the light which is parallel to the c-axis direction of the sapphire single crystalline layer 11. In Table 1, the phrase "c-axis perpendicularity average transmittance" means an average value of the transmittance of the component of the light which is perpendicular to the c-axis direction of the sapphire single crystalline layer 11.

TABLE 1

| | Thickness of $Ca_xCoO_2$ layer 12 (Unit: micrometer) | C-axis parallelism average transmittance | C-axis perpendicularity average transmittance | FIG. |
|---|---|---|---|---|
| Comparative example 1 | 0.1 | 0.99 | 0.88 | FIG. 3 |
| Comparative example 2 | 1 | 0.93 | 0.28 | FIG. 4 |
| Example 1 | 2 | 0.87 | 0.08 | FIG. 5 |
| Example 2 | 4 | 0.76 | 0.01 | FIG. 6 |
| Example 3 | 6 | 0.66 | 0.00 | FIG. 7 |
| Example 4 | 9 | 0.54 | 0.00 | FIG. 8 |
| Example 5 | 12 | 0.45 | 0.00 | FIG. 9 |
| Example 6 | 16 | 0.35 | 0.00 | FIG. 10 |
| Example 7 | 20 | 0.27 | 0.00 | FIG. 11 |
| Comparative example 3 | 25 | 0.20 | 0.00 | FIG. 12 |
| Comparative example 4 | 30 | 0.16 | 0.00 | FIG. 13 |

As is clear from Table 1, when the $Ca_xCoO_2$ crystalline layer 12 has a thickness of not less than 2 micrometers and not more than 20 micrometers, the C-axis parallelism average transmittance is not less than 0.27 and the c-axis perpendicularity average transmittance is not more than 0.08. This means that the output wave 15 includes substantially only the component parallel to the c-axis direction of the sapphire single crystalline layer 11. In other words, the component which is perpendicular to the c-axis direction of the sapphire single crystalline layer 11 was removed sufficiently.

In order to increase the c-axis parallelism average transmittance, it is desirable that the $Ca_xCoO_2$ crystalline layer 12 have a thickness of not less than 2 micrometers and not more than 9 micrometers. More preferably, the $Ca_xCoO_2$ crystalline layer 12 has a thickness of not less than 2 micrometers and not more than 4 micrometers.

When the $Ca_xCoO_2$ crystalline layer 12 has a thickness of not more than 1 micrometer, the component which is perpendicular to the c-axis direction of the sapphire single crystalline layer 11 is not removed sufficiently.

When the $Ca_xCoO_2$ crystalline layer 12 has a thickness of more than 20 micrometers, not only the c-axis perpendicularity average transmittance but also the c-axis parallelism average transmittance are decreased.

Comparative Examples 5-15

In the comparative examples 5-15, instead of the sapphire crystal substrate having a (11-20) plane orientation (namely, an a-plane orientation) on the surface thereof, a sapphire crystal substrate having a (0001) plane orientation (namely, a c-plane orientation) on the surface thereof was used. In the comparative examples 5-15, experiments similar to the examples 1-7 and the comparative examples 1-4 were conducted except that the $Ca_xCoO_2$ crystalline layer 12 having a (001) plane orientation (namely, a c-plane orientation) on the surface thereof was formed.

In FIG. 14-FIG. 24, the black square indicates the transmittance of the components of the light which are parallel to the x-axis direction of the sapphire single crystalline layer 11 having a (0001) plane orientation (namely, a c-plane orientation). In FIG. 14-FIG. 24, the white circle indicates the transmittance of the components of the light which are perpendicular to the y-axis direction of the sapphire single crystalline layer 11 having a (0001) plane orientation (namely, a c-plane orientation). Note that the x-axis direction is perpendicular to the y-axis direction. Table 2 shows the results of the comparative examples 5-15.

TABLE 2

Figure 14:
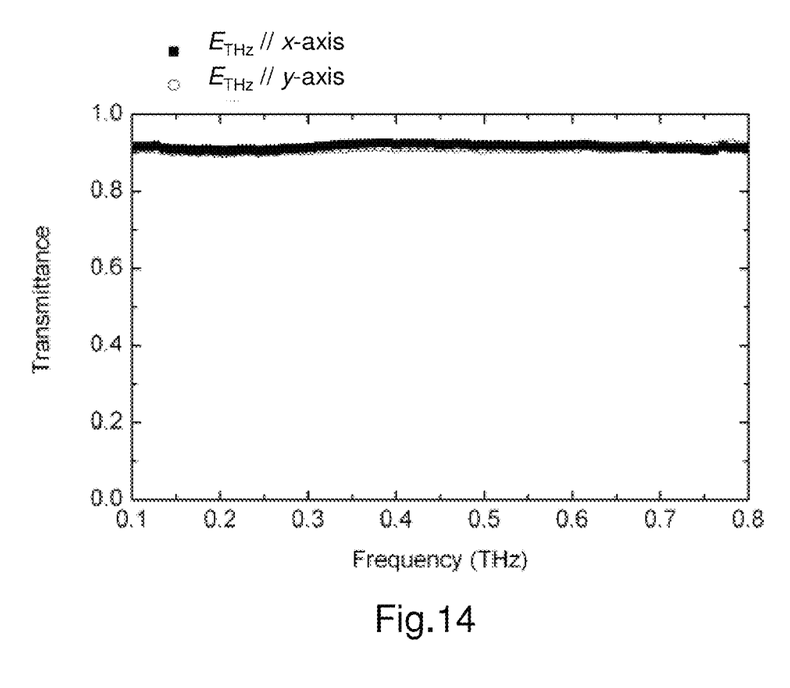
FIG. 14 shows the transmittance spectrum of a $Ca_xCoO_2$ crystalline layer (film thickness: 0.1 micrometer) formed on a sapphire single crystalline layer having a c-plane orientation on the surface thereof.
Figure 15:
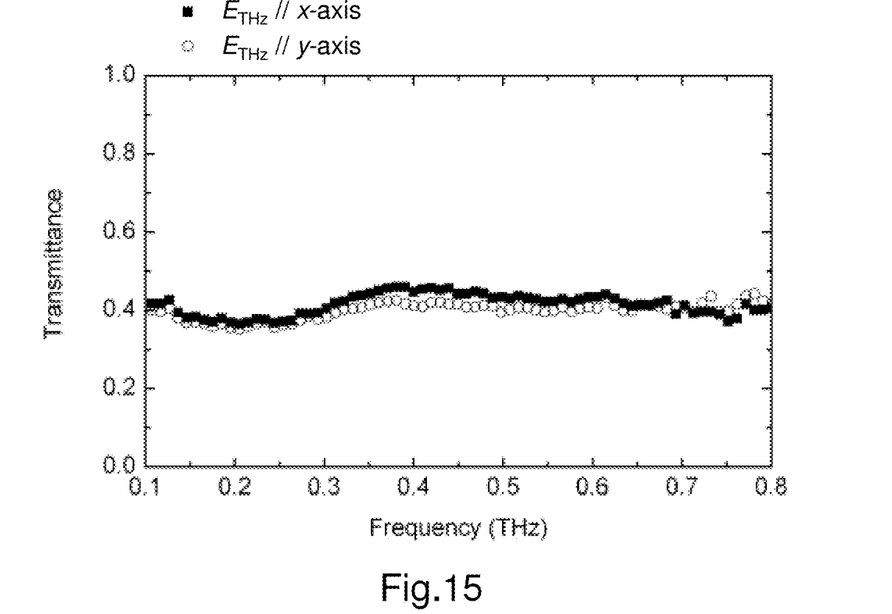
FIG. 15 shows the transmittance spectrum of a $Ca_xCoO_2$ crystalline layer (film thickness: 1 micrometer) formed on the sapphire single crystalline layer having a c-plane orientation on the surface thereof.
Figure 16:
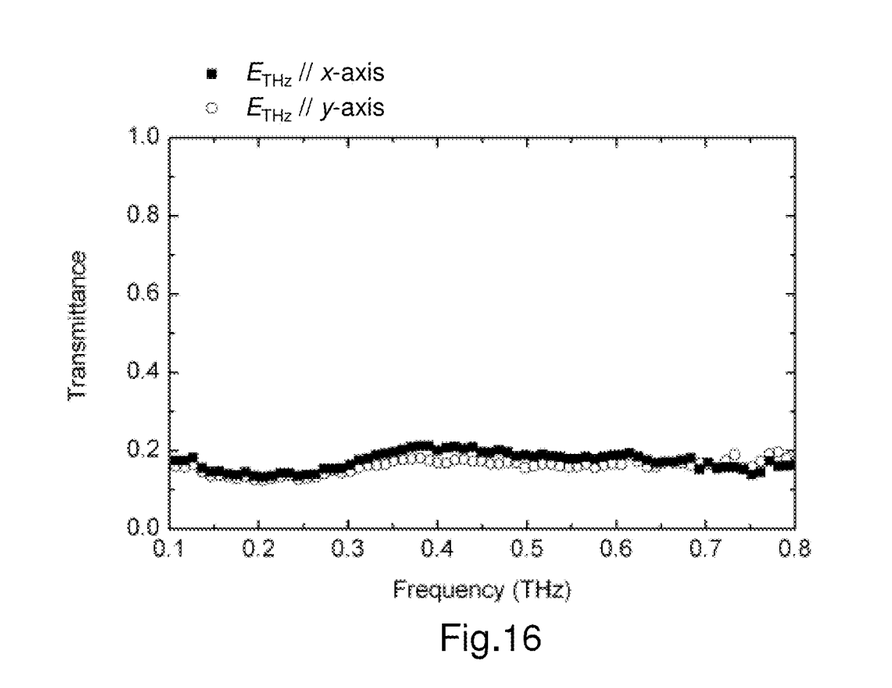
FIG. 16 shows the transmittance spectrum of a $Ca_xCoO_2$ crystalline layer (film thickness: 2 micrometers) formed on the sapphire single crystalline layer having a c-plane orientation on the surface thereof.
Figure 17:
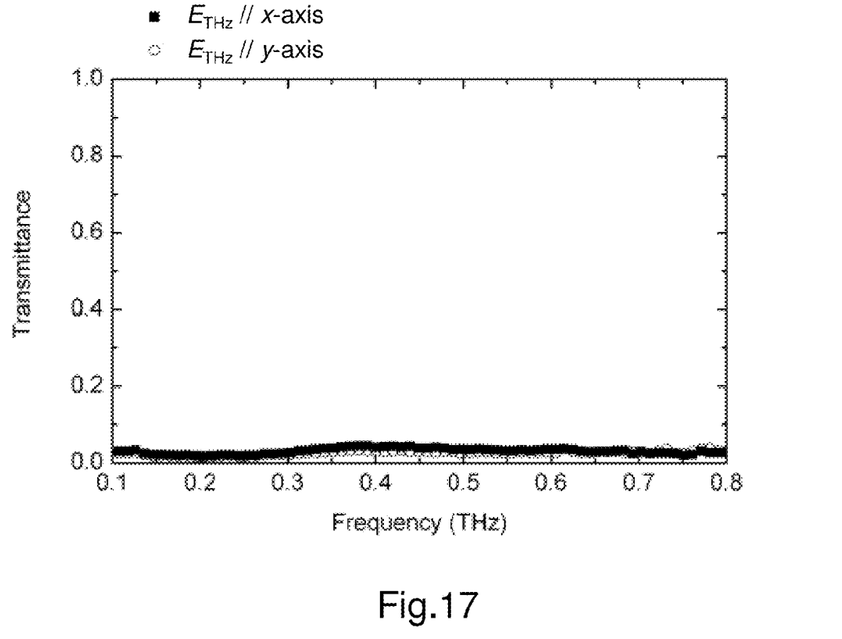
FIG. 17 shows the transmittance spectrum of a $Ca_xCoO_2$ crystalline layer (film thickness: 4 micrometers) formed on the sapphire single crystalline layer having a c-plane orientation on the surface thereof.
Figure 18:
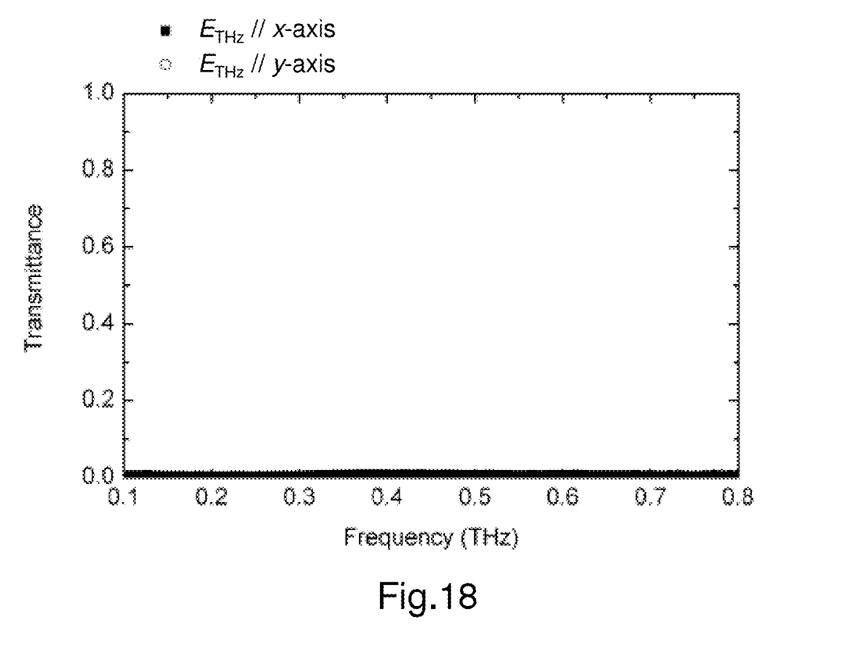
FIG. 18 shows the transmittance spectrum of a $Ca_xCoO_2$ crystalline layer (film thickness: 6 micrometers) formed on the sapphire single crystalline layer having a c-plane orientation on the surface thereof.
Figure 19:
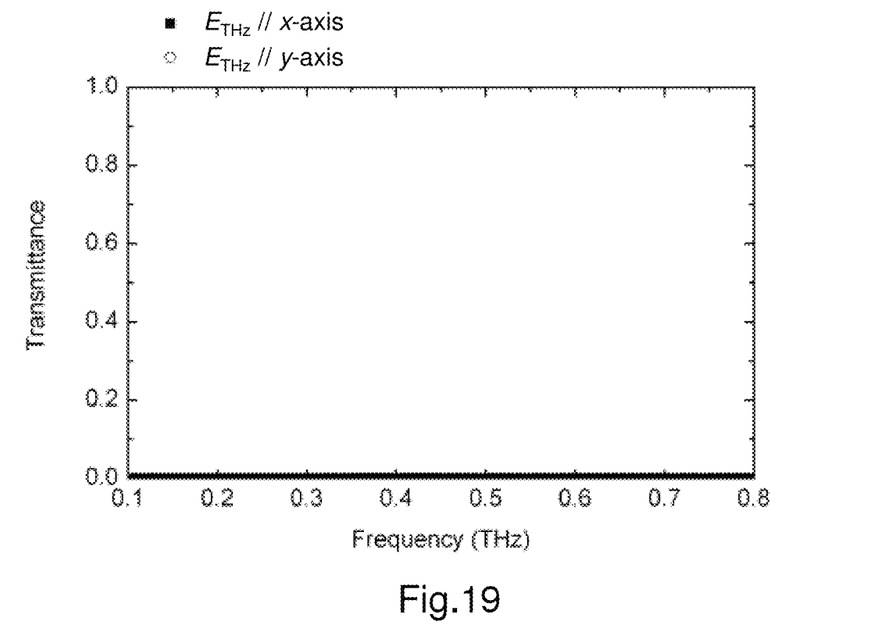
FIG. 19 shows the transmittance spectrum of a $Ca_xCoO_2$ crystalline layer (film thickness: 9 micrometers) formed on the sapphire single crystalline layer having a c-plane orientation on the surface thereof.
Figure 20:
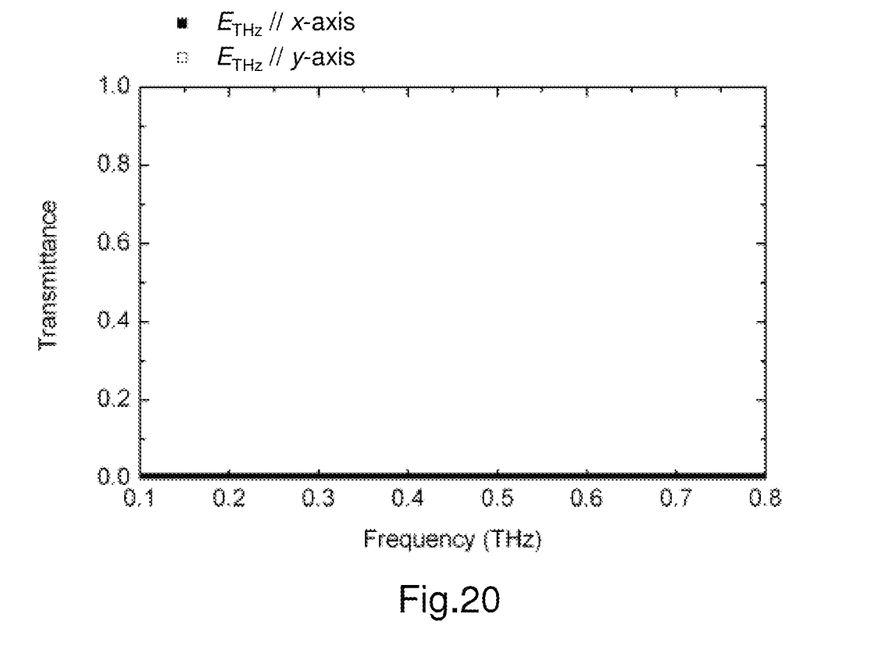
FIG. 20 shows the transmittance spectrum of a $Ca_xCoO_2$ crystalline layer (film thickness: 12 micrometers) formed on the sapphire single crystalline layer having a c-plane orientation on the surface thereof.
Figure 21:
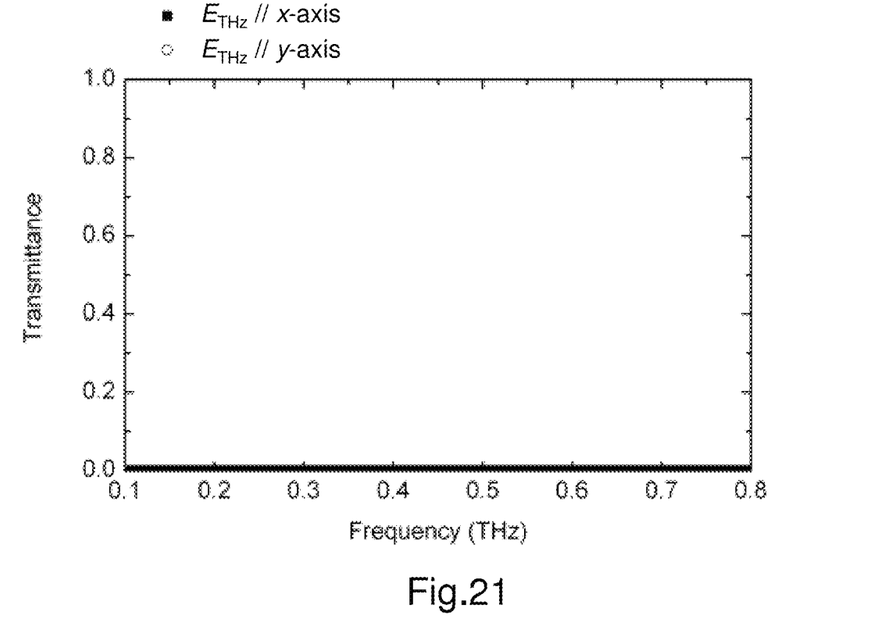
FIG. 21 shows the transmittance spectrum of a $Ca_xCoO_2$ crystalline layer (film thickness: 16 micrometers) formed on the sapphire single crystalline layer having a c-plane orientation on the surface thereof.

| | Thickness of $Ca_xCoO_2$ layer 12 (Unit: micrometer) | C-axis parallelism average transmittance | C-axis perpendicularity average transmittance | FIG. |
|---|---|---|---|---|
| Comparative example 12 | 0.1 | 0.92 | 0.91 | FIG. 14 |
| Comparative example 13 | 1 | 0.41 | 0.40 | FIG. 15 |
| Comparative example 5 | 2 | 0.17 | 0.16 | FIG. 16 |
| Comparative example 6 | 4 | 0.03 | 0.03 | FIG. 17 |
| Comparative example 7 | 6 | 0.01 | 0.00 | FIG. 18 |
| Comparative example 8 | 9 | 0.00 | 0.00 | FIG. 19 |
| Comparative example 9 | 12 | 0.00 | 0.00 | FIG. 20 |
| Comparative example 10 | 16 | 0.00 | 0.00 | FIG. 21 |

TABLE 2-continued

Figure 22:
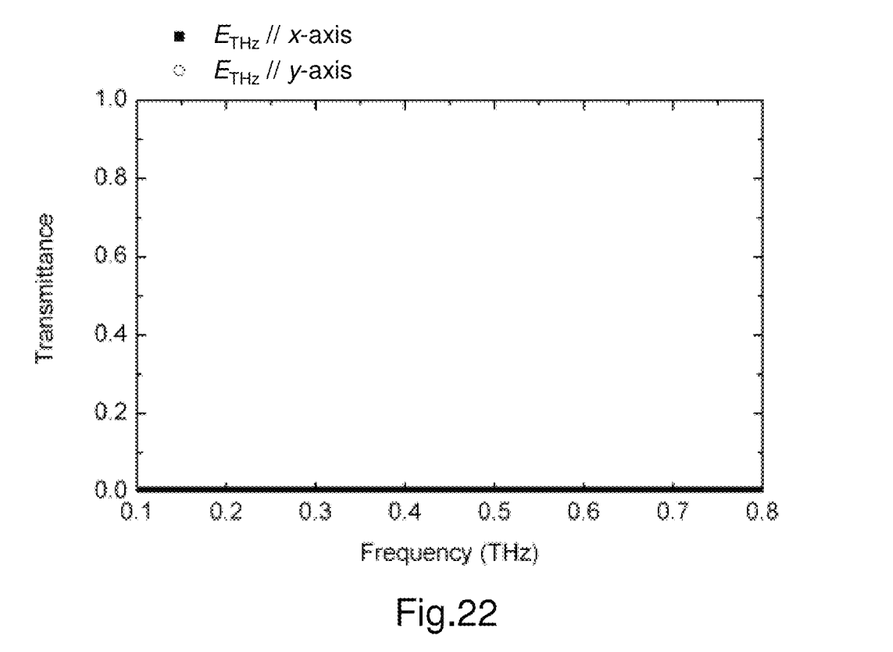
FIG. 22 shows the transmittance spectrum of a $Ca_xCoO_2$ crystalline layer (film thickness: 20 micrometers) formed on the sapphire single crystalline layer having a c-plane orientation on the surface thereof.
Figure 23:
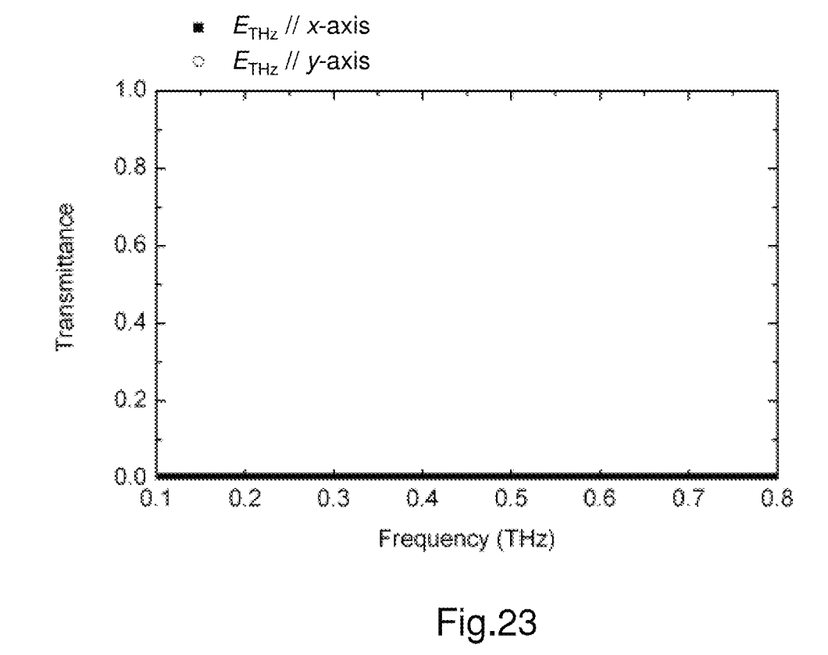
FIG. 23 shows the transmittance spectrum of a $Ca_xCoO_2$ crystalline layer (film thickness: 25 micrometers) formed on the sapphire single crystalline layer having a c-plane orientation on the surface thereof.
Figure 24:
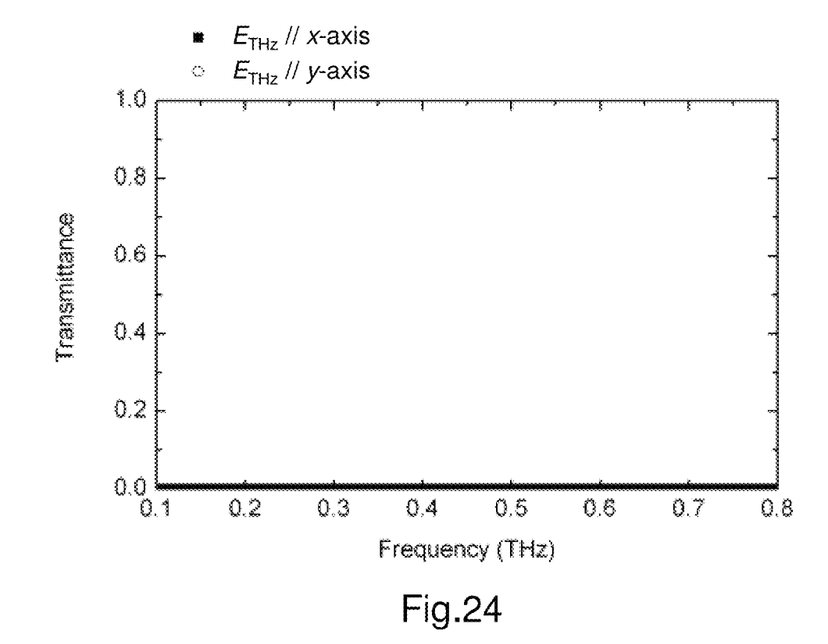
FIG. 24 shows the transmittance spectrum of a $Ca_xCoO_2$ crystalline layer (film thickness: 30 micrometers) formed on the sapphire single crystalline layer having a c-plane orientation on the surface thereof.

| | Thickness of $Ca_xCoO_2$ layer 12 (Unit: micrometer) | C-axis parallelism average transmittance | C-axis perpendicularity average transmittance | FIG. |
|---|---|---|---|---|
| Comparative example 11 | 20 | 0.00 | 0.00 | FIG. 22 |
| Comparative example 14 | 25 | 0.00 | 0.00 | FIG. 23 |
| Comparative example 15 | 30 | 0.00 | 0.00 | FIG. 24 |

As is clear from Table 2, the output wave 15 includes both of the component which is parallel to the c-axis direction of the sapphire single crystalline layer 11 and the component which is perpendicular to the c-axis direction of the sapphire single crystalline layer 11 (see the comparative examples 5, 6, 12, and 13). This means that an incident wave was not polarized at all.

In the comparative examples 7-15, the output wave 15 itself was not output. This is because the $Ca_xCoO_2$ layer 12 was too thick.

INDUSTRIAL APPLICABILITY

The present invention can be used in an optical device, a medical equipment, or a security device.

REFERENCE SIGNS LIST

| 11: | sapphire single crystalline layer |
| 12: | $Ca_xCoO_2$ crystalline layer |
| 14: | electromagnetic wave |
| 15: | output wave |
| 16: | c-axis direction of the sapphire single crystalline layer 11 |
| 21: | electromagnetic wave emitting device |
| 22: | electromagnetic wave receiver |

REFERENCE SIGNS LIST

11: sapphire single crystalline layer
12: $Ca_xCoO_2$ crystalline layer
14: electromagnetic wave
15: output wave
16: c-axis direction of the sapphire single crystalline layer 11
21: electromagnetic wave emitting device
22: electromagnetic wave receiver

The invention claimed is:

1. A method for polarizing an electromagnetic wave having a frequency of not less than 0.1 THz and not more than 0.8 THz using a polarizer, the method comprising:
a step (a) of preparing the polarizer, wherein the polarizer comprises:
a sapphire single crystalline layer; and
a $Ca_xCoO_2$ crystalline layer, where x is not less than 0.15 and not more than 0.55, the $Ca_xCoO_2$ crystalline layer is stacked on the sapphire single crystalline layer,
a surface of the $Ca_xCoO_2$ crystalline layer has a (100) plane orientation, and
the $Ca_xCoO_2$ crystalline layer has a thickness of not less than 2 micrometers and not more than 20 micrometers; and
a step (b) of irradiating the polarizer with the electromagnetic wave having a frequency of not less than 0.1 THz and not more than 0.8 THz to output an output wave having only a component parallel to a c-axis direction of the sapphire single crystalline layer.

2. The method according to claim 1, wherein the $Ca_xCoO_2$ crystalline layer has a thickness of not less than 2 micrometers and not more than 9 micrometers.

3. The method according to claim 1, wherein the $Ca_xCoO_2$ crystalline layer has a thickness of not less than 2 micrometers and not more than 4 micrometers.

4. The method according to claim 1, wherein in the step (b), the sapphire single crystalline layer is irradiated with the electromagnetic wave and the output wave is output from the $Ca_xCoO_2$ crystalline layer.

5. The method according to claim 1, wherein in the step (b), the $Ca_xCoO_2$ crystalline layer is irradiated with the electromagnetic wave and the output wave is output from the sapphire single crystalline layer.

6. The method according to claim 1, wherein in the step (b), the polarizer is irradiated with the electromagnetic wave travelling along a normal direction of the polarizer.

7. The method according to claim 6, wherein in the step (b), the output wave is output from the polarizer along the normal direction of the polarizer.

8. A polarizer comprising:
a sapphire single crystalline layer; and
a $Ca_xCoO_2$ crystalline layer, where x is not less than 0.15 and not more than 0.55, wherein:
the $Ca_xCoO_2$ crystalline layer is stacked on the sapphire single crystalline layer,
a surface of the $Ca_xCoO_2$ crystalline layer has a (100) plane orientation, and
the $Ca_xCoO_2$ crystalline layer has a thickness of not less than 2 micrometers and not more than 20 micrometers.

9. The polarizer according to claim 8, wherein the $Ca_xCoO_2$ crystalline layer has a thickness of not less than 2 micrometers and not more than 9 micrometers.

10. The polarizer according to claim 8, wherein the $Ca_xCoO_2$ crystalline layer has a thickness of not less than 2 micrometers and not more than 4 micrometers.

* * * * *